United States Patent [19]

Persyn

[11] 4,031,855

[45] June 28, 1977

[54] ARTIFICIAL INSEMINATION OF SHRIMP

[75] Inventor: Harvey O. Persyn, Crystal River, Fla.

[73] Assignee: Ralston Purina Company, St. Louis, Mo.

[22] Filed: June 23, 1976

[21] Appl. No.: 699,142

[52] U.S. Cl. .................................................. 119/2
[51] Int. Cl.² ...................................... A01K 61/00
[58] Field of Search ....:..................... 119/1, 2, 3, 4

[56] References Cited

UNITED STATES PATENTS 3,540,414   11/1970   Maloney, Jr. ........................... 119/2
3,682,138   8/1972   Day et al. ................................ 119/2

Primary Examiner—Hugh R. Chamblee
Attorney, Agent, or Firm—W. Dennis Drehkoff

[57] ABSTRACT

A method of artificially inseminating female shrimp with mature ovaries is disclosed wherein the fertilization rate of the eggs is increased and regulated. More specifically, a method of artificially inseminating shrimp is disclosed whereby female shrimp with mature eggs or ovaries and male shrimp with mature spermatophores are selected from those caught in the ocean or raised in a culture pond. The mature spermatophore of the male shrimp is removed, the sperm mass is collected from the spermatophore, and is attached to the female shrimp to effectively fertilize the mature eggs upon spawning in sea water.

11 Claims, No Drawings

ARTIFICIAL INSEMINATION OF SHRIMP

BACKGROUND OF THE INVENTION

This invention relates primarily to innovations in shrimp mariculture wherein the fertilization rate of the shrimp eggs is increased and regulated.

One of the most important fishery products among the crustacea that can be utilized as a food resource for human consumption is the ocean shrimp, particularly the shrimp of the genus, *Penaeus*. This fact has been appreciated, and as a result, cultivation of penaeid shrimp on a commercial scale has been undertaken. However, there are many problems attendant to conventional methods of raising shrimp and to shrimp mariculture operations in general. One of which is obtaining a suitable stock of fertilized eggs on which to base a continuous grow-out operation. Some species of the genus *Penaeus* have matured and mated naturally in captivity, but this has been accomplished on a generally indeterminate basis and no reliance can be given to this method of supplying fertile eggs to a commercial shrimp farm. Therefore, in order to obtain the required shrimp eggs for a shrimp farm grow-out operation it is necessary to capture gravid female shrimp in their natural environment and transfer them to the shrimp farm hatchery. The shipment of such gravid shrimp requires rather close controls to monitor the refrigeration or cooling conditions and the oxygen supply of the shrimp to insure their viability and to inhibit premature spawning. The aforementioned handling process is suitable for those commercially valuable species of penaid shrimp which mate prior to egg development, for example, the brown or grooved species. The groove refers to an axial, posterior indentation along the rostrum of the shrimp. These shrimp have distinctive reproductive characteristics which facilitate the handling of the gravid females. At the time the female brown shrimp moults its exoskeleton, it is vulnerable to mating. It is not understood by researchers in the art if this moult takes place for growing or mating purposes. However, usually before a replacement exoskeleton is formed, the female mates with a male with mature spermatophore or sperm packet. The male inserts the spermatophore into a receptacle on the female called the thelycum, which is located between the fifth pair of walking legs or pereiopods. The female carries the sperm during the egg development and maturation. When the female brown shrimp spawns the mature eggs into the sea water from the ovipores at the base of the third pair of walking legs, the sperm is simultaneously released into the sea water, where fertilization occurs. Seldom is a female brown shrimp caught in the ocean with mature eggs, which has not mated.

Another commercially valuable shrimp, the white or non-grooved species of the genus *Penaeus*, has different reproductive characteristics than the brown or grooved species. The white shrimp species generally respond better to conventional culture conditions, and therefore are more desirable for use in shrimp farming. However, differences in reproductive mode makes it more difficult to obtain fertile eggs. Egg development and maturation in the female white shrimp occur prior to mating. The thelycum or sperm receptacle of the female white shrimp is non-functional and possibly vestigial. The exoskeleton of the female remains attached and hardened during mating which usually occurs about four to twelve hours prior to spawning. The male attaches a sperm packet, commonly referred to as a spermatophore, onto the ventral side of the female between the third and fourth pairs of walking legs. The spermatophore is a chitinous, bananna shaped pouch with two wing-like lateral extensions, and is held in place by a white glutenous material. The sperm mass moves forward inside the spermatophore and is deposited as a jelly-like mass at the base of the third pair of walking legs near the vicinity of the ovipores. When the female white shrimp spawns, the jelly-like mass of sperm dissolves into the sea water simultaneously and fertilizes the eggs. Thus, if wild female white shrimp with mature ovaries are captured in the trawling gear of a shrimp boat, there is a possibility that all of them will not be mated. In fact, it has been the inventor's personal experience while trawling for white shrimp, that for every mated wild female white shrimp with mature ovaries caught, there are captured from one to eight unmated females with mature eggs. This statistic may be due to the random natural mating characteristics of the white shrimp or possibly due to the spermatophore becoming disengaged from the female upon its capture in a trawl.

There is a definite need for a method of artificially inseminating shrimp to allow the selection of desired individuals for mating and to obtain a regulated supply of fertilized eggs for the shrimp farming industry.

SUMMARY OF THE INVENTION

This invention involves a method of artificially inseminating shrimp comprisng selecting female shrimp with mature eggs or ovaries and male shrimp with mature spermatophores, removing the spermatophore from the male shrimp, extracting the sperm mass from the spermatophore, and attaching the sperm mass to the female shrimp to effectively fertilize the mature eggs upon spawning in sea water.

Accordingly, it is the primary object of this invention to provide a method of promoting the fertilization of shrimp eggs. Another object of the present invention is to provide a method of regulating and increasing the rate of fertilization of shrimp eggs to insure a supply of fertilized eggs for a shrimp mariculture operation. And yet another object of this invention is to provide a method of artificially inseminating shrimp so that the selection of desired individuals for mating can be accomplished.

It is a further object of this invention to provide a method of controlling the shrimp population of a shrimp farm to systematically and effectively improve the production thereof.

Detailed Discussion

The female reproductive system of a typical white shrimp, *Penaeus setiferus*, consists of paired ovaries and oviducts. The ovaries are partly fused, bilaterally symmetrical bodies extending in the mature animal for almost its entire length, actually from the cardiac region of the stomach to the telson or tail. In the cephalothoracic region, each organ bears a slender anterior lobe and in most cases, seven finger-like lateral projections. A pair of lobes, one from each ovary, extends the length of the abdomen.

The degree of maturity of the eggs or ovaries of the white shrimp can be determined by visual observation of the color and size of the ovaries at the juncture of the cephalothorax or carapace and abdomen. The ovaries of the young shrimp are small in size and transparent in nature so that their dissection in the fresh specimen is nearly impossible. As the shrimp grows, the glands increase in size, scattered melanophores or brown spots appear over the surface, and in general appearance, the ovaries become somewhat opaque. As maturation continues, the ovaries take a yellow cast which deepens to a yellowish-orange. This is followed by the drab olive-brown color of the ripe ovary. The ovaries, at this point, are so distended that they now fill all available space and appear to crowd considerably the other organs of the body cavity. During the yellow and olive-brown color phases, the ovaries can be seen quite clearly in the abdomen near the membraneous connectives between the abdomen and the cephatothorax or carapace. Upon spawning, the ovary collapses from its distended condition and is not deeply colored as in the ripe phase. As regression continues, the green color disappears from the structure, but the structure remains opaque.

Female shrimp of the genus *Penaeus* do not readily mature their ovaries in captivity unless they are within a few days of natural maturation upon capture from the wild. However, it is known in the mariculture art that penaeid shrimp can be subjected to methods of artificial maturation. Thus, wild or cultured female shrimp can be induced to complete maturation by known artificial means. One of the means of artificial maturation known in the art and the preferable method consists of manipulation of the eyestalks of the female shrimp with immature ovaries. One or both eyestalks of the female can be removed to bring about ovary maturation in about 5 to 20 days. When the ovary maturation process is practiced with the artificial insemination process of the instant invention, the dependence of sourcing gravid female shrimp from the ocean is obviated. Therefore, a shrimp farm can be substantially independent from sourcing in the ocean and yield a continuous production of fertilized eggs and adult food grade size shrimp.

The degree of maturity of the male can also be determined visually by observing the size and color of the spermatophore. The spermatophore can be seen at the juncture of the cephalothorax or head and abdomen of the male white and generally appears as a whitish area extending ventrolaterally. When mature, the spermatophore appears slightly yellow and the area containing the spermatophore becomes fully extended. Additionally, a yellow line marking the spermatophore can readily be seen. Upon removing a mature spermatophore, it will appear yellowish and a portion of the mass, the chitinous material, will be hardened.

The mature spermatophore can be squeezed out manually through the natural openings, or excised from the male shrimp by making an incision into the abdomen at the natural point of exit. The paired spermatophore can then be removed with forceps. The spermatophore must be manipulated to release the sperm mass before the mass can be placed on the female with mature ovaries. Indeed, the sperm mass can be extracted from the spermatophore and shaped by hand to be attached to the female.

A preferred procedure, upon selecting female white shrimp with mature eggs from those caught in the ocean or raised in a culture pond or tank and subjected to artificial maturation so that spawning is imminent within about 1 to about 24 hours, is to surgically remove the mature spermatophores from one or several male white shrimp. The sperm mass then may be squeezed from the spermatophores and formed into a small sphere, about two to five millimeters in diameter. The small sphere of sperm is transferred to a female white shrimp with mature ovaries which may spawn within 1 to 24 hours. The sperm mass is carefully positioned with a probe at the base of the third pair of walking legs of the female, in the vicinity of the ovipores, which is the same position the sperm is located in the naturally mated female. The female is then placed in a tank filled with seawater at a temperature of about 26° to about 30° C and a salinity of about 25 to about 36 parts per thousand to spawn.

The foregoing procedure can be performed by relatively unskilled workers on white shrimp species or any species of shrimp having a similar mode of reproduction such as *P. setiferus, P. vannamei, P. stylirostris*, and *P. occidentalis*.

Further, the preferred procedure will effectively increase the production and yield of fertilized, viable eggs for shrimp mariculture operation. It is known in the art that the fertilization rate of naturally mated white shrimp ranges from about 15% to about 75%.

The following examples disclose a number of practical embodiments of the invention which serve to illustrate the invention and suggest similar embodiments to those skilled in the art.

EXAMPLE 1

White shrimp of the species, *P. stylirostris* were caught in a trawl and transported to the shrimp hatchery. A female shrimp with mature ovaries that were olive-brown in color and clearly seen near the membraneous connectives between the cephathorax and abdomen was selected for mating. It was apparent by noting the color of the ovaries that the female was ready to spawn within 1 to 24 hours. A male shrimp was selected with a mature spermatophore, which appeared as a whitish area located near the juncture of the cephalothorax and abdomen. The spermatophore was removed from the male with a scalpel. The sperm mass was squeezed from the spermatophore and formed into a small sphere. The jelly-like sperm mass was placed on the female at the base of the third pair of walking legs near the ovipores. The female was placed in a tank containing sea water at about 28° C. Two hours later the female spawned. Upon microscopic examination of the eggs, it was determined that about 50% of the eggs were fertilized.

This procedure was repeated four times with other shrimp of the species *P. stylirostris* caught in the trawl and yielded fertilization rates of 15%, 25%, 35% and 50%, respectively.

EXAMPLE 2

Female white shrimp of the species *P. vannamei* were captured from the wild with a shrimp trawler and placed within aerated seawater tanks with a salinity of 36 parts per thousand and a temperature of 28° C. Three females with immature ovaries were selected and one eyestalk on each female was crushed. The ovaries of these females turned to an olive-brown color in ten to twenty days. Males with mature spermatophores were also taken with the shrimp trawler. The spermatophore was removed with a scalpel from one male and squeezed to extract the sperm mass. The mass was manually shaped into a sphere and placed on one female at the base of the third pair of walking legs. The female was then placed in a spawning tank of seawater at a temperature of 28° C and spawning occurred 6 hours later. The eggs were examined microscopically and it was determined that 22% of the eggs were fertilized.

A second female was subjected to the foregoing procedure. Upon the above-described method of artifical insemination and spawning, it was determined that 40% of the eggs were fertilized.

A third female was subjected to the foregoing procedure. Upon the utilization of the method of artifical insemination of the instant invention and spawning, it was determined that 75% of the eggs were fertilized.

EXAMPLE III

The procedure of Example 1 was followed using white shrimp of the species *P. occidentalis*. The fertilization rate of the eggs was 50%. This female spawned 24 hours after artificial insemination.

EXAMPLE IV

The procedure of Example 1 was again followed using white shrimp of the species *P. setiferus*. The fertilization rate of the eggs was 70%, with 3 females, 40% with 6 females, and 25% with 3 females.

As can be seen by the foregoing examples, a predicted fertilization rate can be obtained on a number of different white shrimp species.

What is claimed is:

1. A method of promoting the fertilization of shrimp eggs comprising selecting female shrimp with mature eggs or ovaries and male shrimp with a mature spermatophore, removing the spermatophore from the male shrimp, extracting the sperm mass from the spermatophore, and attaching the sperm mass to the female shrimp with mature eggs or ovaries to effectively fertilize the eggs upon spawning in sea water.

2. The method of claim 1, wherein the female shrimp is selected with mature eggs or ovaries that is ready to spawn in about 1 to 24 hours.

3. The method of claim 1, wherein the sperm mass is attached to the female shrimp at the base of the third pair of walking legs in the vicinity of the ovipores.

4. The method of claim 1, wherein the spermatophore is removed from the mature male shrimp by surgical means.

5. A method of promoting the fertilization of shrimp eggs comprising artificially inducing female shrimp with immature eggs or ovaries to mature the eggs or ovaries in about 10 to about 20 days, and upon the maturation of the eggs or ovaries of the female shrimp, removing a mature spermatophore from a male shrimp, extracting the sperm mass from the spermatophore, and attaching the sperm mass to the female shrimp with the mature eggs to effectively fertilize the eggs upon spawning in sea water.

6. The method of claim 5 wherein the ovaries of the female shrimp are artificially matured by manipulation of its eyestalks.

7. The method of claim 5, wherein the sperm mass is attached to the female shrimp at the base of the third pair of walking legs in the vicinity of the ovipores.

8. The method of claim 5 in which the spermatophore is removed from the mature male shrimp by surgical means.

9. A method of artificially inseminating shrimp comprising the steps of: selecting female shrimp with mature eggs, selecting male shrimp with a mature spermatophore, removing the spermatophore from the male shrimp, extracting the sperm mass from the mature spermatophore, forming the sperm mass into a substantially spherical shape and attaching the sperm mass to the female shrimp with mature eggs to effectively fertilize the eggs upon spawning in sea water.

10. The method of claim 9, wherein the sperm mass is shaped into a sphere that is of sufficient size to be attached to the female shrimp, preferably from about two or five milimeters in diameter.

11. A method of claim 9, wherein the spermatophore is removed from the male shrimp by surgical means.

* * * * *